US007698192B2

(12) United States Patent
Kiron et al.

(10) Patent No.: US 7,698,192 B2
(45) Date of Patent: *Apr. 13, 2010

(54) OPEN END MUTUAL FUND SECURITIZATION PROCESS

(75) Inventors: Kenneth Kiron, 309 W. 57th St. Apt. 1707, New York, NY (US) 10019; Kevin S. Bander, Chicago, IL (US)

(73) Assignee: Kenneth Kiron, Teaneck, NJ (US)

( * ) Notice: Subject to any disclaimer, the term of this patent is extended or adjusted under 35 U.S.C. 154(b) by 2075 days.

This patent is subject to a terminal disclaimer.

(21) Appl. No.: 09/839,888

(22) Filed: Apr. 20, 2001

(65) Prior Publication Data

US 2003/0009405 A2 Jan. 9, 2003

Related U.S. Application Data

(63) Continuation of application No. 09/579,801, filed on May 26, 2000, now abandoned, which is a continuation of application No. 09/140,868, filed on Aug. 27, 1998, now Pat. No. 6,088,685, which is a continuation of application No. 08/542,431, filed on Oct. 12, 1995, now Pat. No. 5,806,048.

(51) Int. Cl.
*G06Q 40/00* (2006.01)
(52) U.S. Cl. .......................................... 705/36; 705/35
(58) Field of Classification Search .................... 705/36
See application file for complete search history.

(56) References Cited

U.S. PATENT DOCUMENTS

| 4,597,046 A | 6/1986 | Musmanno et al. ......... 364/408 |
| 4,615,001 A | 9/1986 | Hudgins, Jr. ................. 364/200 |
| 4,642,768 A | 2/1987 | Roberts ....................... 364/408 |
| 4,674,044 A | 6/1987 | Kalmus et al. |
| 4,751,640 A | 6/1988 | Lucas et al. |
| 4,876,648 A | 10/1989 | Lloyd .......................... 364/408 |
| 4,914,587 A | 4/1990 | Clouse ........................ 364/408 |
| 4,953,085 A | 8/1990 | Atkins ......................... 364/408 |
| 5,101,353 A | 3/1992 | Lupien et al. |
| 5,121,495 A | 6/1992 | Nemes ........................ 395/600 |

(Continued)

OTHER PUBLICATIONS

SPIR Trust Series 1, Application for Orders Under Section 6(c) of the Investment Company Act of 1940.

(Continued)

*Primary Examiner*—Thu Thao Havan
(74) *Attorney, Agent, or Firm*—James P. Muraff; Neal, Gerber & Eisenberg LLP

(57) ABSTRACT

A mutual fund securitization process permitting the trading of open end mutual funds and linked derivative securities on or off the floor of a National Securities Exchange. The targeted individual open end mutual fund or group of open end mutual funds, selected through a screening process is securitized through the creation of a new, separate security. This new security is preferably a "closed end fund of funds" and linked derivative securities, which synthetically replicate the statistical relationship of the defined individual or group of open end mutual funds. The maintenance of financial records for the new security is maintained by electronically storing dividend, capital gains and income received from the open end funds which have been invested in, and calculating pro-forma financial statements to disseminate to shareholders and all relevant parties.

82 Claims, 3 Drawing Sheets

U.S. PATENT DOCUMENTS

| | | | |
|---|---|---|---|
| 5,126,936 | A | 6/1992 | Champion et al. |
| 5,132,899 | A | 7/1992 | Fox .............................. 364/408 |
| 5,189,608 | A | 2/1993 | Lyons et al. ................. 364/408 |
| 5,193,056 | A | 3/1993 | Boes ........................... 364/408 |
| 5,206,803 | A | 4/1993 | Vitagliano et al. ........... 364/408 |
| 5,214,579 | A * | 5/1993 | Wolfberg et al. ........... 705/36 R |
| 5,557,517 | A | 9/1996 | Daughterty, III ............ 364/408 |
| 5,644,727 | A | 7/1997 | Atkins |
| 5,671,363 | A | 9/1997 | Cristofich et al. |
| 5,812,987 | A | 9/1998 | Luskin et al. |
| 6,088,685 | A * | 7/2000 | Kiron et al. ................ 705/36 R |
| 2002/0046154 | A1 | 4/2002 | Pritchard |

OTHER PUBLICATIONS

SPIR Trust Series 1, First Amended and Restated Application for Orders Under Section 6(c) of the Investment company Act of 1940.

Form S-6 (EL24) for registration under the Securities Act of 1933.

Amendment No. 1 to Form S-6 (EL24A) for registration under the Securities Act of 1933.

Amendment No. 2 to Form S-6 (EL24C) for registration under the Securities Act of 1933.

Amendment No. 3 to Form S-6 for registration under the Securities Act of 1933.

Dialog Abstract: File 256, Acc# 01203769; Macro World Investors 5.0; Macro World Research Corp; Released: Jan. 1988.

Hill; "Program Trading of Equities: Renegade or Mainstream?"; *Business Horizons*; vol. 32 No. 6; p. 47(9); Nov.-Dec. 1989; Dialog: File 148, Acc# 04165265.

Dialog Abstract: File 16, Acc# 03222677; Prime Asset Mgmt; *Pensions & Investments*; May 20, 1991; p. 69.

Cohen; "Canada: First Marathon Inc. Make Fund Tracking User-Friendly"; *Financial Post (FINPO)*; Sep. 14, 1992; p. 20; Dialog File 772, Acc# 09062758.

Gitter, "Investing, For the Passive-Aggressive"; *Financial Planning*; Feb. 1995; p. 59; Dialog: File 16, Acc# 05639063.

Dialog Abstract: File 256, Acc# 01561525; Principia for Closed-End Funds 1.0; Morningstar Inc. Released: Jul. 1995.

Schramm; "Index Managers Get Active"; *Pensions 7 Investments*; Oct. 16, 1995; p. 3; Dialog: File 16, Acc# 05784105.

Duff, "Index Funds with a Twist Can Be Market Beaters"; *Money*; vol. 24 No. 10; p. 53; Oct. 1995; Dialog: File 15, Acc# 01091136.

Opinion and Order of U.S. District Judge Shira A. Scheindlin, dated Feb. 4, 2003, in American Stock Exchange, LLC vs. Mopex, Inc., 00 Civ 5943 (SAS), granting Plaintiff's Motion for Summary Judgment.

Application pursuant to Section 6(c) of The Investment Company Act of 1940 for an Order Granting Exemption From the Provisions of Sections 4(2) and 22(c) of the Act, and Rule 22c-1 thereunder, and for an Order Pursant to Section 11(a) and 11(c) of the Act Approving the Exchange of Shares of an Open-End Management Investment Company for Units of a Unit Investment Trust, by the SuperTrust for Capital Market Fund, Inc. Shares, Capital Market Fund, Inc. and SuperShare Services Corporation (Apr. 3, 1989).

First Amended and Restated Application pursuant to Section 6(c) of the Investment Company Act of 1940 for an Order Granting Exemption from the Provisions of Sections 4(2), 18(f)(1) and (i), 22(c), Rule 22c-1 and for an Order pursuant to Sections 11(a) and 11(c) of the Act Approving the Exchange of Shares of an Open-End Management Investment Company for Units of a Unit Investment Trust, by the SuperTrust for Capital Market Fund, Inc. Shares, Capital Market Fund, Inc. and SuperShare Services Corporation (Sep. 7, 1989).

Second Amended and Restated Application pursuant to Section 6(c) of the Investment Company Act of 1940 for an Order Granting Exemption from the Provisions of Sections 4(2), 22(c), Rule 22c-1 thereunder, and 22(d) of the Act and for an Order pursuant to Sections 11(a) and 11(c) of the Act Approving the Exchange of Shares of an Open-End Management Investment Company for Units of a Unit Investment Trust, by the SuperTrust for Capital Market Fund, Inc. Shares, Captial Market Fund, Inc. and SuperShare Services Corporation (Feb. 6, 1990).

Third Amended and Restated Application pursuant to Section 6(c) of the Investment Company Act of 1940 for an Order Granting Exemption from the Provisions of Sections 4(2), 22(c), Rule 22c-1 thereunder, and 22(d) of the Act, and for an Order pursuant to Sections 11(a) and 11(c) of an Open-End Management Investment Company for Units of a Unit Investment Trust, by the SuperTrust for Capital Market Fund, Inc. Shares, Capital Market Fund, Inc. and SuperShare Services Corporation (Apr. 2, 1990).

Fourth Amended and Restated Application pursuant to Section 6(c) of the Investment Company Act of 1940 for an Order Granting Exemption from the Provisions fo Sections 4(2), 22(c), Rule 22c-1 thereunder, and 22(d) of the Act, and for an Order pursuant to Sections 11(a) and 11(c) of the Act Approving the Exchange of Shares of an Open-End Management Investment Company for Units of an Unit Investment Trust, by the SuperTrust for Capital Market Fund, Inc. Shares, Capital Market Fund, Inc. and SuperShare Services Corporation (Jul. 3, 1990).

Fifth Amended and Restated Application pursuant to Section 6(c) of the Investment Company Act of 1940 for an Order Granting Exemption from the Provisions of Sections 4(2), 22(c), Rule 22c-1 thereunder, and 22(d) of the Act, and for an Order pursuant to Sections 11(a) and 11(c) of the Act Approving the Exchange of Shares of an Open-End Management Investment Company for Units of a Unit Investment Trust, by the SuperTrust for Capital Market Fund, Inc. Shares, Capital Market Fund, Inc. and SuperShare Services Corporation (dated Jul. 6, 1990).

Notice of Application for Exemption under the Investment Company Act of 1940 by the Super Trust Trust of Capital Market Fund, Inc., Inv. Co. Act Rel. No. IC-17613 (Jul. 25, 1990).

Order Denying a Hearing Request, Granting a Conditional Exemption Under Section 6(c) of the Act from Sections 4(2) and 22(d) of the Act and Rule 22c-1 thereunder, and Approving an Offer of Exchange Under Sections 11(a) and 11(c) of the Act, in the Matter of the SuperTrust Trust for Capital Market Fund, Inc. Shares, et al., Inv. Co. Act Rel. No. IC-17809 (Oct. 19, 1990).

SEC No-Action Letter re The SuperTrust Trust for Capital Market Fund, Inc. Shares (Jun. 24, 1992), including the SuperTrust Trust for Capital Market Fund, Inc. Shares' No-Action Request (Mar. 30, 1992).

Prospectus, The SuperTrust Trust for Capital Market Fund, Inc., dated Mar. 6, 1992.

Registration Statement (Form N-1A) under the Investment Company Act of 1940, of Capital Market Fund, Inc. (Mar. 6, 1992).

Peter Tufano & Barbara B. Kyrillos, *Leland O'Brien Rubinstein Associates Incorporated: SuperTrust*, Harvard Business School case study 294-050 (Jun. 6, 1994).

Application for Orders Under section 6(c) of the Investment Company Act of 1940 exempting the SPIR Trust, Series I (and any additional and similar Series of the SPIR Trust), and SPIR Services Corporation, as Sponsor, from the Provisions of sections 4(2), 12(d)(3), 14(a), 22(c), 22(d) and 26(a)(2)(C) of said Act and from rules 12d3-1 and 22c-1 promulgated thereunder (Jun. 26, 1990).

First Amended and Restated Application for Orders Under section 6(c) of the Investment Company Act of 1940 exempting the SPIR Trust, Series I (and any additional and similar Series of the SPIR Trust), and SPIR Services Corporation, as Sponsor, from the Provisions of sections 4(2), 14(a), 22(d) and 26(a)(2)(C) of said Act and from rule 22c-1 promulgated thereunder (Feb. 6, 1991).

Second Amended and Restated Application for Orders Under section 6(c) of the Investment Company Act of 1940 exempting the SPDR Trust, Series I and PDR Services Corporation, as Sponsor, from the Provisions of sections 4(2), 14(a), 17(d), 22(d), 22(e), 24(d) and 26(a)(2)(C) of said Act and from rule 22c-1 promulgated thereunder and under section 17(b) exempting the Trust from the provisions of sections 17(a)(1) and 17(a)(2) of said Act (Feb. 28, 1992).

Third Amended and Restated Application for Orders Under section 6(c) of the Investment Company Act of 1940 exempting the SPDR Trust, Series I (and any additional and similar Series of the SPDR Trust), and PDR Services Corporation, as Sponsor, from the Provisions of sections 4(2), 14(a), 17(a)(1) and 17(a)(2), 22(d), 22(e), 24(d) and 26(a)(2)(C) of said Act and from rule 22c-1 promulgated thereunder and under section 17(b) exempting the Trust from the provisions of sections 17(a)(1) and 17(a)(2) of said Act and under rule 17d-1 from the provisions of section 17(d) (Jun. 8, 1992).

Fourth Amended and Restated Application for Orders Under section 6(c) of the Investment Company Act of 1940 exempting the SPDR Trust, Series I (and any additional and similar Series of the SPDR Trust), and PDR Services Corporation, as Sponsor, from the Provisions of sections 4(2), 14(a), 17(a)(1), 17(a)(2), 22(d), 22(e), 24(d) and 26(a)(2)(C) of said Act and from rule 22c-1 promulgated thereunder, under section 17(a)(1) and 17(a)(2) of said Act and under rule 17d-1 granting relief from the provisions of section 17(d) (Aug. 7, 1992).

Notice of Filing of Proposed Rule Change by the American Stock Exchange, Inc. Relating to Portfolio Depositary Receipts, Exchange Act Release No. 34-31039 (Aug. 20, 1992).

Order Approving Proposed Rule Change by the American Stock Exchange, Inc. Relating to Portfolio Depositary Receipts, Exchange Act Release No. 34-31591 (Dec. 11, 1992).

Notice of Application for Order under the Investment Company Act of 1940, by the SPDR Trust, Series 1, Rel. No. 1C-18959 (Sep. 23, 1992).

In re The Matter of SPDR Trust, Series 1 PDR Services Corporation, Conditional Order under Sections 6(c) and 17(b) of the Act Exempting Applicants From Sections 4(2), 14(a), 17(a), 22(d), 22(e), 24(d), 26(a)(2)(C), and Rule 22c-1, and under Rule 17d-1 Permitting Applicants to Engage in Certain Affiliated Transactions Otherwise Prohibited by Section 17(d) and Rule 17d-1 (Oct. 26, 1992).

Prospectus, Standard & Poor's Depositary Receipts, SPDR Trust Series 1, dated Jan. 22, 1993 (Feb. 3, 1993).

Prospectus, Standard & Poor's Depositary Receipts, SPDR Trust Series 1, dated May 20, 1994.

Nils H. Hakansson, *The Purchasing Power Fund: A New Kind of Financial Intermediary*; FIN. ANALYSTSJ,49,(Nov.-Dec. 1976).

Nils H. Hakansson, *Welfare Aspects of Options and Supershares*, XXXIII No. 3 J. of FIN. 759 (Jun. 1978).

Prospectus, Put and Call Options and Index Participations, by The Options Clearing Corporation, dated Apr. 21, 1989.

Application for Orders under Section 6(c) of the Investment Company Act of 1940 exempting The Germany EuroTrust Trust, Series 1 of The EuroTrust Trusts, EuroFund, Inc., Deutsche Bank Securities Corporation, as Adviser, and SuperShare Services Corporation, as Sponsor, from the provisions of Sections 4(2), 17(a)(1), 17(a)(2), 22(d), 24(d) and 26(a)(2)(C) of said Act and from Rule 22c-1 promulgated thereunder, under Section 17(b) exempting the Trust, the Fund, the Adviser and the Sponsor from the provisions of Sections 17(a)(1) and 17(a)(2) of the Act and for an Order pursuant to Sections 11(a) and 1.1(c) of the Act approving the exchange of shares of the initial series of the Fund for units of the Germany EuroTrust Trust, by The Germany EuroTrust Trust, Series 1 of the EuroTrust Trusts, EuroFund, Inc., Deutsche Bank Securities Corporation, as Adviser, and SuperShare Services Corporation, as Sponsor (Aug. 19, 1994).

Foreign Fund, Inc., Application for Orders under section 6(c) of the Investment Company Act of 1940 exempting applicant from the provisions of sections 2(a)(32), 5(a)(1), 17(a)(1) and 17(a)(2), 22(d) and 22(e), and rule 22c-1 thereunder, and under section 17(b) exempting applicant from sections 17(a)(1) and 17(a)(2) of such Act (Sep. 19, 1994).

Application for Orders under Section 6(c) of the Investment Company Act of 1940 exempting Foreign Fund, Inc. from the provisions of Section 2(a)(32), 5(a)(1), 17(a)(1) and 17(a)(2), 22(d) and 22(e) of said Act, and Rule 22c-1 promulgated thereunder, and under Section 17(b) exempting Foreign Fund, Inc. from the provisions of Sections 17(a)(1) and 17(a)(2) of said Act (Sep. 19, 1994).

Amendment No. 1 to the Application for Orders under Section 6(c) of the Investment Company Act of 1940 exempting Foreign Fund, Inc. from the provisions of Section 2(a)(32), 5(a)(1), 17(a)(1) and 17(a)(2), 22(d) and 22(e) of said Act, and Rule 22c-1 promulgated thereunder, and under Section 17(b) exempting Foreign Fund, Inc. from the provisions of Sections 17(a)(1) and 17(a)(2) of said Act (Jan. 5, 1995).

Barclays Global Fund Advisors and BGI Exchange Traded Fund and its Index Series—Application for an Order under Section 6(c) of the Investment Company Act of 1940 for an exemption from Sections 2(a)(32), 5(a)(1), and 22(d) and 22(e) of the Act and Rule 22c-1 under the Act and under Sections 6(c) and 17(b) of the Act for an exemption from Sections 17(a)(1) and (a)(2) of the Act (as filed with the SEC on Apr. 30, 1999).

Barclays Global Fund Advisors and BGI Exchange Traded Fund and its Index Series—Application for an Order under Section 6(c) of the Investment Company Act of 1940 for an exemption from Sections 2(a)(32), 5(a)(1), and 22(d) and 24(d) of the Act and Rule 22c-1 under the Act and under Sections 6(c) and 17(b) of the Act for an exemption from Sections 17(a)(1) and (a)(2) of the Act (as filed with the SEC on Apr. 30, 1999).

In the matter of Foreign Fund, Inc. and BZW Barclays Global Fund Advisors, File No. 812-10334; Application for an Order of Exemption under Section 17(d) of the Investment Company Act of 1940 (the "1940Act") and Rule 17d-1(a) thereunder pursuant to Rule 17d-1(b) under the 1940 Act (as received by the SEC on Sep. 13, 1996).

In the matter of Web Index Fund, Inc. and Barclays Global Fund Advisors, File No. 812-10334; Amendment No. 2 to the Application for an Order of Exemption under Section 17(d) of the Investment Company Act of 1940 (the "1940 Act") and Rule 17d-1(a) thereunder pursuant to Rule 17d-1(b) under the 1940 Act (Mar. 10, 1997).

Amendment No. 4 to the Application for Orders under Section 6(c) of the Investment Company Act of 1940 exempting Foreign Fund, Inc. from the provisions of Sections 2(a)(32), 5(a)(1), 17(a)(1) and 17(a)(2), 22(d) and 22(e) of said Act, and Rule 22c-1 promulgated thereunder, and under Section 17(b) exempting Foreign Fund, Inc. from the provisions of Sections 17(a)(1) and 17(a)(2) of said Act (as received by the SEC on Feb. 20, 1996).

Gastineau, Gary L., *An Introduction to Exchange-Traded Funds (ETFs)*, Nuveen Investments; Feb. 8, 2001, pp. 1-12.

Application for Orders under Section 6(c) of the Investment Company Act of 1940, as amended, exempting WEBS Index Fund, Inc. from the provisions of Sections 2(a)(32), 5(a)(1), 17(a)(1) and 17(a)(2), 22(d) and 22(e) of said Act, and Rule 22c-1 promulgated thereunder, and under Section 17(b) exempting WEBS Index Fund, Inc. from the provisions of Sections 17(a)(1) and 17(a)(2) of said Act (as received by the SEC on Aug. 14, 1997).

Application for Orders under Section 6(c) of the Investment Company Act of 1940 exempting The Germany EuroTrust Trust, Series 1 of The EuroTrust Trusts, EuroFund, Inc., Deutsche Bank Securities Corporation, as Adviser, and SuperShare Services Corporation, as Sponsor, from the provisions of Sections4(2), 17(a)(1), 17(a)(2), 22(d), 24(d) and 26(a)(2)(C) of said Act and Rule 22c-1 promulgated thereunder, under Section 17(b) exempting the Trust, the Fund, the Adviser and the Sposor from the provisions of Sections 17(a)(1) and 17(a)(2) of the Act and for an Order pursuant to Setions 11(a) and 11(c) of the Act approving the exchange of shares of the initial series fo the Fund for unit of the Germany EuroTurst Trust (as received by the SEC on Aug. 19, 1994).

First Amended and Restated Application for Orders under Section 6(c) of the Investment Company Act of 1940 exempting The EuroTrust Trust, its initial two Series, The Germany EuroTrust Trust and The UK EuroTrust Trust, EuroFund, Inc., Deutsche Bank Securities Corporation, as Adviser, and SuperShare Services Corporation, as Sponsor, from the provisions of Sections 4(2), 17(a)(1), 17(a)(2), 22(d) and 26(a)(2)(C) of said Act and from Rule 22c-1 promulgated thereunder under Section 17(b) exempting the Trusts, the Fund, the Adviser and the Sponsor from the provisions of Sections 17(a)(1) and 17(a)(2) of the Act and for an Order pursuant to Sections 11(a) and 11(c) of the Act approving the exchange of shares of the series of the Fund for units of the Trusts (as received by the SEC on Oct. 28, 1994).

Second Amended and Restated Application for Orders (i) under Section 6(c) of the Investment Company Act of 1940 exempting, as the case may be, The EuroTrust Trust, its initial two trusts, The Germany EuroTrust Trust and The UK EuroTrust Trust, EuroFund, Inc. and its initial two Series, the German Index Series and the UK Index Series; Deutsche Bank Securities Corporation, as Adviser, and SuperShare Services Corporation, as Sponsor, from the provisions of Sections 2(a)(32), 4(2), 5(a)(1), 17(a)(1), 17(a)(2), 22(d), 22(e) and 26(a)(2)(C) of said Act and from Rule 22c-1 promulgated thereunder; (ii) pursuant to Sections 11(a) and 11(c) of the Act approving the exchange of shares of the Fund for units of the Trusts; and (iii) under Section 17(b) exempting the Trusts, the Fund, the Adviser and the Sponsor from the provisions of Sections 17(a)(1) and 17(a)(2) of the Act and (as received by the SEC on Nov. 30, 1994).

SEC Form N-1A, Registration Statement Under the Securities Act of 1933, Pre-Effective Amendment No. 1, and Registration Statement under the Investment Company Act of 1940, Amendment No. 1, of Foreign Fund, Inc. (as filed with the SEC on Dec. 14, 1995).

SEC Form N-1A, Registration Statement Under the Securities Act of 1933, Pre-Effective Amendment No. 1, and Registration Statement under the Investment Company Act of 1940, Amendment No. 1, of Foreign Fund, Inc. (as filed with the SEC on Dec. 14, 1995) (Marked to Show Changes).

SEC Form N-1A, Registration Statement Under the Securities Act of 1933, Pre-Effective Amendment No. 3, and Registration Statement under the Investment Company Act of 1940, Amendment No. 3, of Foreign Fund, Inc. (as filed with the SEC on Mar. 6, 1996).

American Stock Exchange, Stock Index Options, Proposed Contract Specifications, S&P MidCap Index Options, Dec. 2, 1991.

Standard & Poor's Depositary Receipts™, *SPDR™ User's Guide*, PDR Services Corporation, Jan. 1993.

Amendment No. 1 to the Application for Orders under Section 6(c) of the Investment Company Act of 1940 exempting the MidCap SPDR Trust, Series 1 and PDR Services Corporation, as Sponsor, from the provisions of Sections 4(2), 14(a), 17(a)(1), 17(a)(2), 22(d), 22(e), 24(d) and 26(a)(2)(C) of said Act and from Rule 22c-1 promulgated thereunder, under Section 17(b) exempting the Sponsor and the Trust from the provisions of Sections 17(a)(1) and 17(a)(2) of said Act and under Rule 17d-1 granting relief from the provisions of Section 17(d) and Rule 17d-1 (executed Jul. 13, 1994).

American Stock Exchange, Stock Index Options, Contract Specification, S&P MidCap Index Options, Jan. 23, 1992.

Information Circular to Members and Member Organizations, Senior and Compliance Registered Options Principals, and Registered Options Principals from Howard A. Baker, Senior Vice President, AMEX Derivative Securities, announcing a new listing: Standard & Poor's MidCap 400 Depositary Receipts™ with trading to begin on May 4, 1995. Dated: Apr. 28, 1995.

Standard & Poor's Depositary Receipts ("SPDR") Trust Series 1 and Any Subsequent and Similar Series of the SPDR Trust, Standard Terms and Conditions of Trust, dated as of Jan. 1, 1993 between PDR Services Corporation, as Sponsor, and State Street Bank and Trust Company, as Trustee, effective Jan. 22, 1993.

Prospectus: Toronto 35 Index Participation Units dated Nov. 20, 1989.

Gastineau, Gary, "Exchange-Traded vs. OTC Derivatives Markets," *Financial Derivatives and Risk Management*, Issue Three, Nov. 1995.

Section 7, Special Article: "Minimizing Cash Drag With S&P 500 Index Tools" by Goldman Sachs.

Standard & Poor's Depositary Receipts, "SPDR User's Guide," PDR Services Corporation, 1993.

*The Future of Exchange Traded Funds, An Emerging Alternative to Mutual Funds*, Financial Research Corporation May 31, 2000.

Gastineau, Gary L., "A Short History of Program Trading," *Financial Analysts Journal*, Sep.-Oct. 1991, pp. 4-7.

Angel, James J., et.al., "Comparison of Two Low-Cost S&P 500 Index Funds," reprinted from *Derivatives Quarterly* Spring, 1996.

Gastineau, Gary L, et al., Exchange-Traded Equity Funds—Genesis, Growth, and Outlook, pp. 121-141.

Product Description for Standard & Poor's Depositary Receipts—SPDRs®, pp. 1-4.

Standard & Poor's Depositary Receipts, "SPDR™ Traded on the American Stock Exchange, Ticker Symbol SPY,", PDR Services Corporation, 1993, and "The SPDR™ Report," Aug. 1994.

"Main Marketing Message About SPDRs," Educational Material.

Standard & Poor's Depositary Receipts™, Specifications, Symbol: SPY, American Stock Exchange, May 16, 1994.

Standard and Poor's Depositary Receipts™ ("SPDRs")™, SPDR Trust Series 1, A Unit Investment Trust, Annual Report, Dec. 31, 1994.

Standard and Poor's Depositary Receipts™ ("SPDRs")™, SPDR Trust Series 1, A Unit Investment Trust, Annual Report, Dec. 31, 1995.

Telefacsimile Transmission from James Curtis, Division of Investment Management, U.S. Securities and Exchange Commission, to Paul J. McElroy, Sullivan & Cromwell, forwarding the Notice of Application for Exemption Under the Investment Company Act of 1940, of Foreign Fund, Inc., BZW Barclays Global Fund Advisors and Funds Distributor, Inc., dated Feb. 7, 1996.

Order of the U.S. Securities and Exchange Commission, dated Mar. 5, 1996, granting the application for exemption under the Investment Company Act of 1940 of Foreign Fund, Inc., BZW Barclays Global Fund Advisors and Funds Distributor, Inc.

Letter dated Oct. 17, 1995, from Kevin C. Rupert, Accountant, U.S. Securities and Exchange Commission, to Paul J. McElroy, Sullivan & Cromwell, regarding Foreign Fund, Inc., and containing comments on the registration statement on Form N-1A filed on behalf of Foreign Fund, Inc.

Letter dated Dec. 14, 1995, from Paul J. McElroy, Sullivan & Cromwell, to Kevin C. Rupert, Accountant, U.S. Securities and Exchange Commission, regarding comments made by K. Rupert in his letter of Oct. 17, 1995, and regarding the filing of a Pre-Effective Amendment No. 1 to the Fund's Registration Statement on Form N-1A.

Form N-1A, Pre-Effective Amendment No. 3, filed by Foreign Fund, Inc. on Mar. 5, 1996, with the U.S. Securities and Exchange Commission.

Exhibits to Form S-6, Pre-Effective Amendment No. 3 to Registration Statement of The Supertrust Trust for Capital Market Fund, Inc. Shares.

Brochure: SuperTrust, Subscription Period, 1992.

"Introduction to The SuperTrust," SSC Distribution Services, Inc., 1991.

"The SuperTrust Summary Graphics," SSC Distribution Services, Inc., 1991.

Form N-1A, Post-Effective Amendment No. 3 and Registration Statement Under the Investment Company Act of 1940, Amendment No. 7, of Capital Market Fund, Inc., as filed with the SEC on Mar. 1, 1993.

*IDD* (*Investment Dealers Digest*), Nov. 30, 1992, pp. 1-50.

*Federal Register*, Notices, vol. 55, No. 114, Wednesday, Jun. 13, 1990, pp. 24016-24018.

"Distributor of SuperTrust Shares Seeks No-Action Position," *The SEC Today*, Wednesday Jul. 1, 1992, vol. 92-127, pp. 1-2.

"The SuperTrust Subscription Period," SSC Distribution Services, Inc., Jun. 1992, pp. 1-8.

Brochure for MidCap SPDRs—Standard & Poor's MidCap 400 Depositary Receipts.

Advertisement for MidCap SPDR, Standard & Poor's MidCap 400 Depositary Receipts.

American Stock Exchange News Release, Apr. 21, 1995. "Joel Lovett Elected to Sixth Year as Vice Chairman of AMEX's Board of Governors".

Newspaper Articles: Kristof, Kathy M., "Add 'Spiders' to Growing Web of Investment," *Los Angeles Times*, Aug. 25, 1995: Metz, Robert, "Spinning Profits Using SPDRs," *Houston Chronicle*, Aug. 2, 1995; Metz, Robert, "Snare Profits in Your Web With SPRDs," *Tulsa World*, Aug. 6, 1995.

SES Docket, vol. 58, No. 10, pp. 1707-1708 (Jan. 18, 1995).

*Federal Register*, Notices, vol. 59, No. 248, Wednesday, Dec. 28, 1994, 66982-66985.

Cochran, Thomas N., "The Striking Price."

Capital Market Fund, Inc. Annual Report, Oct. 31, 1994, pp. 1-16.

Prospectus: The SuperTrust™ Trust for Capital Market Fund. Inc. Shares, Feb. 28, 1995.

Prospectus: Capital Market Fund, Inc., Feb. 28, 1995.

The SuperTrust™ Trust for Capital Market Fund, Inc. Shares, Annual Report, Oct. 31, 1994.

Capital Market Fund, Inc., Annual Report, Oct. 31, 1994.

SCC SuperUnits™, Proposed Specifications, American Stock Exchange, Mar. 16, 1992.

"Equity Derivatives—Applications in Corporate Finance and Fund Management," CIBC Wood Gundy School of Financial Products.

MidCap SPDR Trust, Series 1 and PDR Services Corporation, Amendment No. 1 to Application for Orders under section 6(c) of the Investment Company Act of 1940 exempting the MidCap SPDR Trust, Series 1 and PDR Services Corporation, as Sponsor, from the provisions of sections 4(2), 14(a), 17(a)(1), 17(a)(2), 22(d), 22(e), 24(d) and 26(a)(2)(C) of said Act and from rule 22c-1 promulgated thereunder, under section 17(b) exempting the Sponsor and the Trust from the provisions of sections 17(a)(1) and 17(a)(2) of said Act and under rule 17d-1 granting relief from the provisions of section 17(d) and rule 17d-1 (Jan. 13, 1994).

SEC Docket, vol. 58, No. 20, pp. 2765-2772 (Mar. 24, 1995).

In the Matter of MidCap SPDR Trust, Series 1, File No. 1-13730, Order Declaring Registration Effective Pursuant to Section 12(d) of the Securities Exchange Act of 1934, as Amended, U.S. Securities and Exchange Commission, Apr. 27, 1995.

In the Matter of PDR Services Corporation, Sponsor of MidCap SPDR Trust, Series 1, Order Pursuant to Section 8(a) of the Securities Act of 1933 as Amended, Declaring the Registration Statement Effective, U.S. Securities and Exchange Commission, Apr. 27, 1995.

Brochure: Standard & Poor's MicDap 400 Depositary Receipts, Product Description, PDR Services Corporation, 1995.

*Federal Register*, Notices, vol. 60, No. 62, Friday, Mar. 31, 1995, 16686-16690.

Brochure: Standard & Poor's MidCap 400 Depositary Receipts™, 400 Stocks, One Easy Investment, PDR Services, 1995.

American Stock Exchange Home Page; The American Stock Exchange, 1995.

American Stock Exchange News Release, Apr. 27, 1995, "MidCap 400 'Spiders' to Spin Their Own Web at the AMEX".

Expert Report of C. Michael Carty dated Apr. 5, 2002.

Rebuttal Report of C. Michael Carty dated May 10, 2002.

Fifth Amended and Restated Application for Orders under Section 6(c) of the Investment Company Act of 1940 exempting The CountryBaskets™ Index Fund, Inc. and its initial nine Series named herein the Advisor and the Distributor from the provisions of Sections 2(a)(32), 5(a)(1), 17(a)(1), 17(a)(2), 22(d) and 22(e) of said Act, and from Rule 22c-1 promulgated thereunder, and under Section 17(b) from the provisions of Sections 17(a)(1) and 17(a)(2) of the Act dated Jun. 26, 1995.

Affidavit of Clifford J. Weber, dated Aug. 30, 2002, filed in American Stock Exchange, *LLC* vs. *Mospex, Inc.*, Civil Action No. 00 Civ. 5943(SAS)(MHD).

Supplemental Affidavit of Clifford J. Weber, dated Oct. 10, 2002, filed in American Stock Exchange, *LLC* vs. *Mopex, Inc.*, Civil Action No. 00 Civ. 5943(SAS)(MHD).

Expert Witness Report of Clifford J. Weber, dated Apr. 2, 2002, filed in American Stock Exchange, *LLC* vs. *Mopex, Inc.*, Civil Action No. 00 Civ. 5943(SAS)(MHD).

Expert Report of Kathryn B. McGrath, dated Apr. 3, 2002, filed in American Stock Exchange, *LLC* vs. *Mopex, Inc.*, Civil Action No. 00 Civ. 5943(SAS)(MHD).

Rebuttal Expert Report of Kathryn B. McGrath, dated May 17, 2002, filed in American Stock Exchange, *LLC* vs. *Mopex, Inc.*, Civil Action No. 00 Civ. 5943(SAS)(MHD).

Expert Report of Harry F. Manbeck, Jr., dated Apr. 5, 2002, filed in American Stock Exchange, *LLC* vs. *Mopex, Inc.*, Civil Action No. 00 Civ. 5943(SAS)(MHD).

Rebuttal Expert Report of Harry F. Manbeck, Jr., dated May 7, 2002, filed in American Stock Exchange, *LLC* vs. *Mopex, Inc.*, Civil Action No. 00 Civ. 5943(SAS)(MHD).

Expert Report of Donald Banner, dated May 14, 2002, filed in American Stock Exchange, *LLC* vs. *Mopex, Inc.*, Civil Action No. 00 Civ. 5943(SAS)(MHD).

Expert Witness Report of Gary L. Gastineau, dated Mar. 28, 2002, filed in American Stock Exchange, *LLC* vs. *Mopex, Inc.*, Civil Action No. 00 Civ. 5943(SAS)(MHD).

Application for Orders under Section 6(c) of the Investment Company Act of 1940 exempting Foreign Fund, Inc. from the provisions of Sections 2(a)(32), 5(a)(1), 17(a)(1) and 17(a)(2), 22(d) and 22(e) of said Act, and Rule 22c-1 promulgated thereunder, and under Section 17(b) exempting Foreign Fund, Inc. from the provisions of Sections 17(a)(1) and 17(a)(2) of said Act, dated Sep. 15, 1994.

Amendment No. 2 to the Application for an Order of Exemption Under Section 17(d) of the Investment Company Act of 1940 (The "1940 Act") and Rule 17d-1(a) Thereunder Pursuant to Rule 17d-1(b) Under the 1940 Act, in the matter of Webs Index Fund, Inc. and Barclays Global Fund Advisors, dated Mar. 14, 1997.

\* cited by examiner

FIG. 1A

10 — GENERAL DATA PROCESSING COMPUTER SYSTEM: MEMORY STORAGE CONTAINS MASTER DATABASE OF OPEN END MUTUAL FUND STATISTICS PREFERRED SPECIFICATION OF COMPUTER: CDROM DRIVE, MONITOR HARD DRIVE CONTAINING 420 MEGABYTES 8 MEGABYTES RAM, 486 CPU

12 — ELIMINATE THOSE FUNDS IN MASTER DATABASE WHERE FUNDS ARE MARKED "NOT AVAILABLE FOR PURCHASE" PUT REMAINING FUNDS IN NEW DATABASE: "DATABASE #1"

14 — ELIMINATE ALL FUNDS IN DATABASE #1 WHERE ASSET SIZE IS NOT EQUAL TO "USER DEFINED" STORING REMAINING FUNDS IN NEW DATABASE: "DATABASE #2"

16 — SEARCH DATABASE "DATABASE #2" FOR THOSE FUNDS WHERE CATEGORY OF INVESTMENT STYLE = "USER DEFINED" AND PLACE IN NEW DATABASE: "DATABASE #3"

18 — SEARCH DATABASE #3; SELECT THOSE FUNDS WHERE RETURN OVER TIME (T) > AVERAGE OF ALL FUNDS IN DATABASE #3 WHERE TIME (T) = "USER DEFINED" AND STORE IN NEW DATABASE NAMED: "DATABASE #4"

20 — SEARCH DATABASE #3 AND SELECT FUNDS WHERE RISK OVER TIME (T) < AVERAGE OF ALL FUNDS IN DATABASE #3 WHERE TIME (T) = "USER DEFINED" AND RISK = "USER DEFINED". STORE SELECTED FUNDS IN NEW DATABASE NAMED: "DATABASE #5"

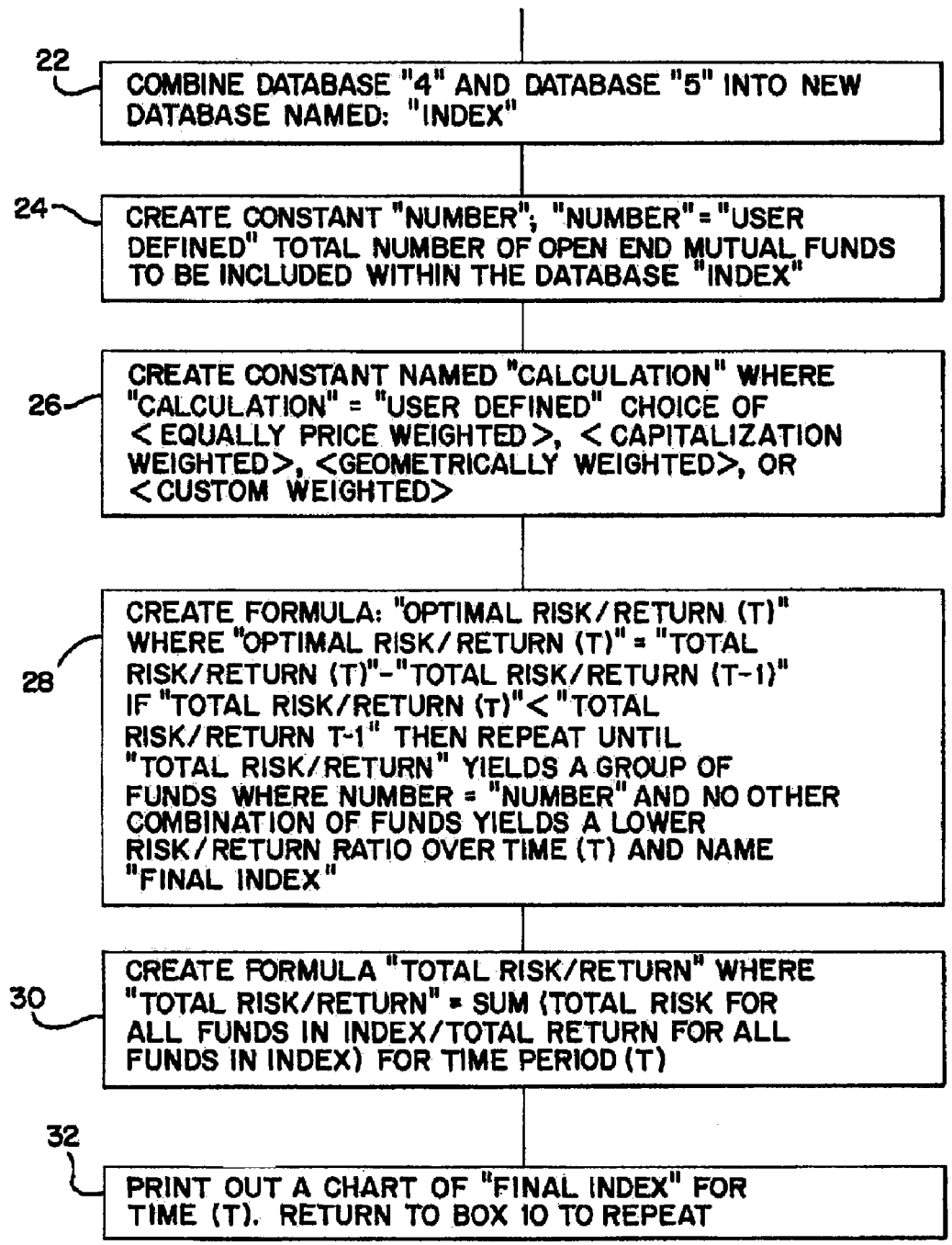

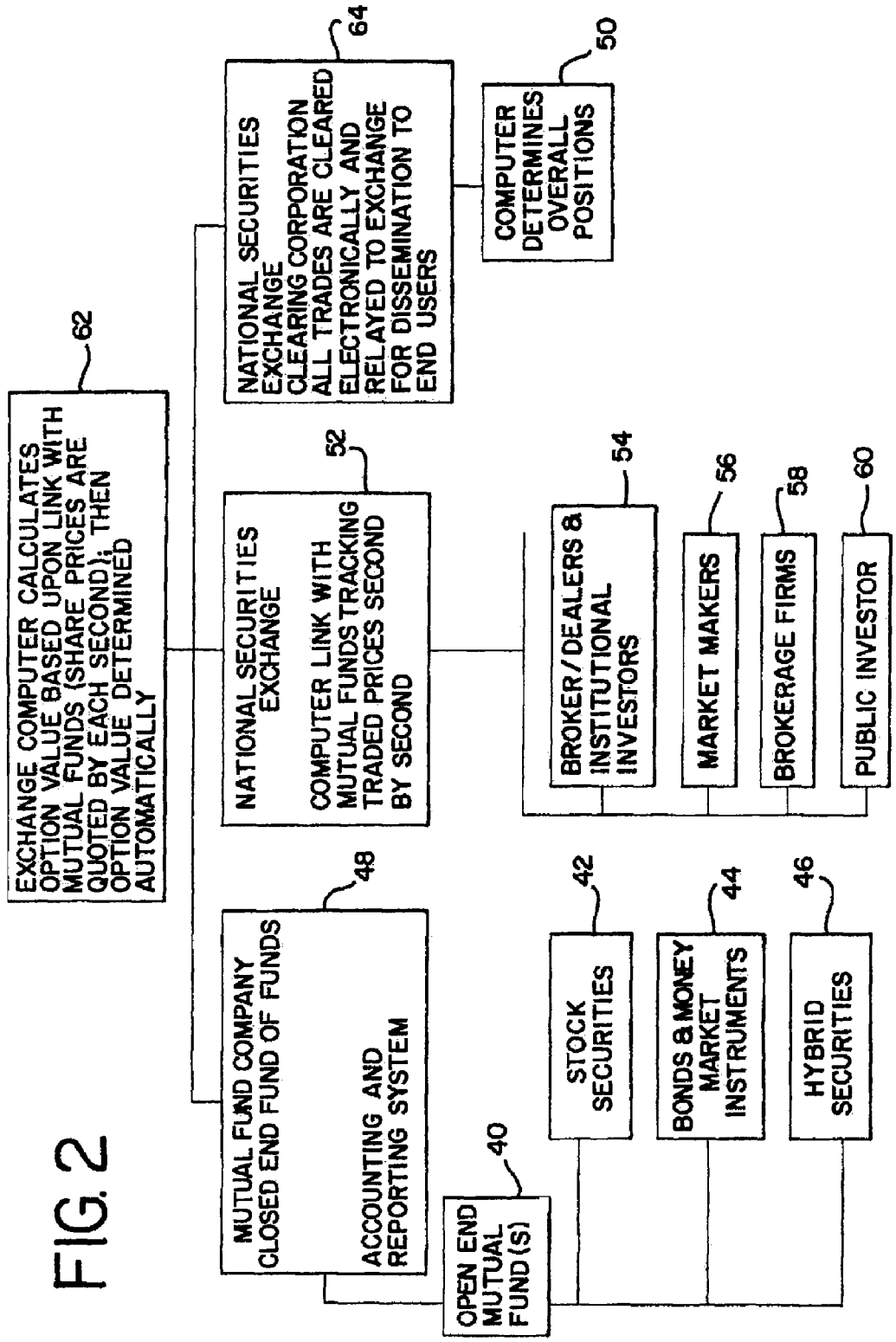

OPEN END MUTUAL FUND SECURITIZATION PROCESS

This Application is a continuation of U.S. application Ser. No. 09/579,801 filed May 26, 2000, now abandoned which is a continuation of U.S. application Ser. No. 09/140,868 filed Aug. 27, 1998, now U.S. Pat. No. 6,088,685, which is a continuation of U.S. application Ser. No. 08/542,431 filed Oct. 12, 1995 now U.S. Pat. No. 5,806,048.

This application relates to a new financial process which securitizes open end mutual funds to facilitate intra-day trading of the funds and linked derivative securities.

BACKGROUND OF THE INVENTION

There are currently over 7,000 open end mutual funds registered with the Securities and Exchange Commission. None of these open end mutual funds, or any index of open end mutual funds, or any linked derivative, are traded on a National Securities Exchange. The reason for this phenomenon lies in the way that open end mutual funds sell their shares, and subsequently buy back their shares from the public.

Open end funds are required by law to sell their shares at the net asset value (N.A.V.), which represents the total assets owned by the fund, less the total liabilities, divided by the number of shares outstanding, plus a sales charge (also known as a sales load). When buying back their shares, open end funds must, by law, buy back their shares at their fund's N.A.V.

Many mutual funds make hundreds (if not thousands) of trades during the day, purchasing and selling a wide range of financial securities, some of which are difficult to value. Thus, it is time consuming, tedious, expensive and otherwise difficult to determine an exact N.A.V. during the day. Consequently, over 99% of all open end funds allow investors to purchase and sell their funds only at the end of the day. The remaining 1% of open end funds, commonly known as sector funds, calculate their N.A.V. every hour, allowing a more frequent ability to buy or sell their shares. In either case, however, the investor does not know what price will be paid for the open end fund shares until after the order has been placed, and the fund has calculated its N.A.V.

Recently, mutual fund portfolio managers have developed a new type of mutual fund called an open end fund of funds. A fund of funds is an open end fund that invests in other open end mutual funds. But like all the other open end funds created in the past, they can only be bought and sold at the end of the day.

Another new product developed is called the SPDR™, which is short for Standard and Poors Depository Receipt. This security, which is traded on the American Stock Exchange, represents a fractional share of a basket of stocks known as the Standard and Poors 500 index (S&P500). While many mutual funds invest in the S&P500, the SPDR is not a mutual fund; it is a basket of stocks set up as unit investment trust, where the total amount of shares outstanding within the trust fluctuates daily.

In 1992, a large investment banking house created and became the market maker for a basket of stocks which attempted to replicate the performance of a few select open end sector funds, a basket that was traded intra-day on the Over the Counter Market (OTC). Unfortunately, because the net asset value of the open end sector funds was unknown during the 59 minutes of each hour that the basket was traded, the spread between the price that the firm was willing to buy the funds and sell the funds for was large. Further, the correlation between the performance of the basket of stocks to the performance of the open end sector funds was neither reliable nor consistent. This problem existed because the open end fund managers were constantly buying and selling securities during the day, and the investment banking house did not know exactly which securities the open end funds held.

Another recent development within the mutual fund industry is a service that allows investors to buy and sell open end funds during the day. The Jack White & Co., a regional brokerage firm, maintains a screen-based computer system which provides a private market place for investors to buy and sell a small number (less than six percent) of all open end mutual funds at a price other than net asset value, provided buyer and seller can agree on a price. This service has failed to generate significant trading volume, however, because only the public can buy or sell fund shares. Institutional investors, pension funds, portfolio managers, and other professional investors, which traditionally represent 70 to 80% of trading volume, are prevented by law from buying or selling open end mutual funds at a price other than N.A.V. The Jack White program also allows short selling, but shares must be "found," which can take days, weeks, or months to complete the transaction. As a result of these restrictions, it is very difficult, if not impossible, for either the public or the professional investor to purchase or sell open end mutual funds during the day.

Because of the lack of liquidity and the legal obstacles involved in trading open end funds at prices other than N.A.V., up to now, those skilled in developing new products for stock exchanges thought that there was no workable way to trade open end funds, an index of open end funds, or linked derivative securities. The obstacles appeared insolvable.

All of the open end funds and products presently available suffer a number of disadvantages:

A) Open end funds cannot sell or buy back their shares at a price other than N.A.V. (plus sales load, if any).

B) Open end funds are unable to let their customers know what price they will receive when they place their order.

C) Open end funds are not traded on an exchange so investors cannot leverage their investments through the trading of derivative securities.

D) Open end funds do not allow investors to place orders including: good 'til cancelled (GTC), open, market, limit, stop loss, or stop limit, which would allow an investor to purchase or sell shares at a specific price or time.

E) Open end funds impose fees for purchases and sales of their shares if they occur frequently.

F) Open end funds impose fees for investors who do not own a minimum amount of shares.

G) Open end shares cannot be easily sold short. Shares must be found, which could take days, weeks or even years.

H) All shares of open end mutual funds and unit investment trusts theoretically could be redeemed in one day, meaning a fund may have its assets drop to zero at any time.

I) Open end fund shares cannot be sold or purchased except through written notification, which may take several days to mail or process.

SUMMARY OF THE INVENTION

The present invention's open end fund securitization process will allow for the first time: (a) intra-day trading of an unlimited number of mutual fund indexes comprised of open end funds; (b) intra-day trading of an unlimited number of open end mutual funds with a greater degree of liquidity; and (c) intra-day trading of derivative securities linked to open end funds and indexes of open end funds.

This process is made possible by the creation of a second type of security, which will invest substantially all of its assets in the targeted open end mutual fund shares. The preferred embodiment for this new security is a "closed end fund of funds", which has a fixed number of shares outstanding, and a constant portfolio which is invested exclusively in the shares of the targeted open end fund(s). The result is a new security which will synthetically replicate the performance of those shares purchased, and do so with a high degree of correlation and consistency. This new security can then be listed on a National Securities Exchange and traded without restriction. After trading begins, linked derivative securities can then be listed and traded.

Other objects and advantages of the present invention include:

A) Any open end fund, when securitized, can be listed on a stock exchange and traded at any second, minute or hour, regardless of the open end fund N.A.V.

B) Investors can determine what price will be paid before an order is placed.

C) A National Securities Exchange (N.S.E.) will be able to list derivatives on the securitized open end funds, because of the greater price transparency generated through the trading of the securitized open end funds. The invention will act as a hedge for market makers who wish to lay off their risk of making markets in options on the underlying security.

D) Investors will be able to leverage their investments.

E) Investors will be able to place GTC, open, stop loss, market, limit orders when buying or selling their funds.

F) Investors can buy or sell the securitized funds as often as they wish with no penalty.

G) Investors will be able to purchase or sell their shares immediately by making a phone call to their broker, or by electronic trading.

H) Investors will not be charged arbitrary fees for frequent purchases or selling of the securitized open end funds.

I) Investors will not be charged additional fees for owning small quantities of shares.

J) The securitized funds have fixed number of shares which provides stability of asset levels.

K) Investors will be able to sell shares short quicker, and with greater liquidity.

L) Open end fund management will benefit from reduced volatility in their cash levels and in their frequently traded customer account assets, resulting in lower fund expense ratios.

M) Investors purchasing a securitized fund will pay a reduced sales load in many cases than they would otherwise have to pay because of the bulk purchasing power the securitized fund will have when investing in specific open end funds.

Further objects and advantages include the ability to trade a futures contract on both a securitized fund share and an index of securitized fund shares with linked derivative securities. In addition, the present invention solves a long existing but unsolved and unrecognized need. Many investors, both professional and non-professional own multiple mutual funds in an effort to diversify their investment portfolio's. An index of open end mutual funds would allow greater diversification, lower transaction costs, expanded investment choices and the ability to measure their fund performance against a relevant benchmark index. The index could be calculated many different ways with a great deal of flexibility: equal price weighted, capitalization weighted, or geometrically weighted, depending upon the need. Still further objects and advantages will become apparent from a consideration of the ensuing description and drawings.

BRIEF DESCRIPTION OF DRAWINGS

The present invention will be more fully understood by reference to the following detailed description thereof when read in conjunction with the attached drawings, and wherein:

FIGS. 1A and 1B represent how an open-end mutual fund index is created in a general data processing computer. These figures represent computer requirements and also comprise a schematic flowchart of process operating therewithin.

FIG. 2 illustrates how the preferred embodiment of an open-end mutual fund index is synthetically replicated through the creation of a new security. The preferred embodiment for this new security is a "closed end fund" and linked derivative securities.

DETAILED DESCRIPTION OF DRAWINGS

Referring to FIG. 1A, the box designated 10 represents an electronic database (a "master database") of extensive statistical information stored in a computer containing the entire universe of open end mutual fund statistics in existence registered in the defined country or geographic area. The preferred embodiment database includes extensive statistics for each open end fund. This information includes fund net asset value (N.A.V.) for each year, portfolio composition, investment objective, load adjusted and unadjusted return, maximum sales charge, median market capitalization, daily, monthly, quarterly, yearly, multi-year returns, mpt, beta, sharpe, R squared, standard deviation, historical risk/reward ratios, N.A.V. distribution adjusted earning, payout ratio, potential capital gains exposure, price/book ratio, price/earnings ratio, prospectus, purchase constraints, redemption fees, sector weighting, shareholder fees, total return, total return percentile, turnover ratio, deferred fees, debt % total capitalization, dividends, distributor, telephone number, manager name, manager tenure, class of shares, and brokerage availability. It will be understood that not all of this information is required to practice the claimed invention.

As also reflected in box 10, the computer itself has a preferred specification of at least 420 megabytes of internal memory (hard drive), eight megabytes of RAM (random access memory), a CD ROM player operating at 4x speed (at least), a Pentium CPU, VGA monitor, and a keyboard.

The box designated 12 represents a computer program algorithm or step that eliminates those funds not available for purchase and puts these funds into a new database where these funds are stored in memory. This function acts as a filter eliminating from the search all open end mutual funds that are not available for purchase. The algorithm creates a new memory storage area containing those funds that fit within the criteria and stores those funds within a new section of the computer memory. This new memory location can be accessed by its new name: DATABASE #1. The history of open end mutual funds makes this algorithm very important. Because funds frequently close their doors to new money (as their popularity increases), keeping track of which funds can be purchased at the initial screening stage reduces the waste of memory that would occur by repeatedly saving large amounts of information redundantly to the hard drive.

The box designated 14 represents the step where a minimum asset size of the fund is selected; the time period(s) through which statistics will be retrieved (time t) is chosen and the computer is directed to create a new database where these funds are stored in memory. There are hundreds of funds that have assets of less than $5,000,000. The ability to buy and eventually sell a large amount of shares in a thinly capitalized fund could be problematic. In addition, the smaller funds tend to be the most volatile and tend to have shorter track records to measure their past performance. The minimum asset size selection will direct the computer to select only those funds that have a pre-selected asset level, mitigating some of these potential problems.

The time period (t) for which statistics will be chosen is very important. More so than many other types of security, an open end mutual fund is "ranked" for its performance based upon how well it does over specific time periods. The ability to segregate fund statistics information over various time horizons provide a unique tool to evaluate a funds performance.

The box designated 16 represents a computer program algorithm which separates the group of funds stored in a database created by the step set forth in box 14. This new group of funds is stored in a new memory location defined by its specific investment criteria. This criteria may include a subgroup including the fund investment objective or the sector weightings of its portfolio. Currently, the major fund investment objective subgroups include Aggressive Growth, Growth and Income, Growth, Income, Bond, Sector, Asset Allocation, Specialty, Equity Income, Europe Stock, Foreign Stock, Government Bond, Hybrid Income, Small Company, World Stock and World Bond.

The box designated 18 represents a computer program algorithm which searches and identifies all the funds where the statistical performance is greater than the aggregate subgroup over time periods (t) and puts these funds into a new database where these funds are stored in a new memory location. The performance of a fund can be measured in many ways. It could be based upon total return, load adjusted return, unadjusted load return, or a return with dividends reinvested. Once the specified performance criteria have been selected, the computer can average all of the funds in that subgroup before retrieving those funds that have above average returns. All funds, for example, that have returns better than 50% of the funds in the universe would be selected as being above the "average" subgroup return. These funds would then be stored in a new memory location, to be analyzed at a later time.

The box designated 20 represents an algorithm where the computer searches and retrieves all funds where the risk is smaller than the aggregate subgroup over time periods (t) and stores these funds in a new database. Funds, for example that have a smaller risk profile than 50% (the exact average) of the funds in the subgroup would be selected as beating the "average" subgroup return. These funds would then be stored in a new memory location, to be analyzed at a later time.

Referring to FIG. 1B, the box designated 22 represents an algorithm where the computer combines the funds identified by the steps taken as set forth in boxes 18 and 20 to create a new group of open end mutual funds that have the lowest combined risk to return ratio over time periods (t) and puts these funds into a new database where the information on these funds is stored in a new memory location. Generally, this type of function is called a Relationship Search routine because it allows for linking together user defined criteria to produce one result. It is a very powerful tool for linking large amounts of information together.

The box designated 24 represents a step where the number of funds that the index will contain is chosen. This number could range from 1 to the number of funds in the database. Depending upon the investment objective or how much money is available to invest in the index, this number will fluctuate.

The box designated 26 represents the step where the index calculation method is selected. An index generally is calculated one of three ways; "Equally Priced", meaning all of the price are added up and divided by the total number of securities; "Capitalization Weighted", which is based upon the amount of price of the security times the number of shares outstanding; or "Geometrically Weighted", which involves a more complicated averaging of share prices. The index value can dramatically shift depending upon what weighting is used.

The box designated 28 represents a step that uses a formula which sequentially analyzes each risk/reward ratio of each permutation of funds selected by the computer in step represented in the box designated 30.

Box 30 is an algorithm wherein the general data processor eliminates the large risk/reward combinations found in "database index" using the formula determined by box 28, and sequentially stores in memory the smallest risk/reward combinations, stopping only when the smallest risk/reward ratio is found. This results in the selection of the final index. When all of the funds with superior returns have been identified and stored, and all the funds with lower than average risk have been identified and stored, the computer can then match up all of the different combinations of funds to determine which group contains the optimally lowest risk/highest return ratio. This ratio can be calculated over multiple time period to provide for example, the lowest ratio over 1, 3, 5, and 10 years. In the final group of funds, the number selected by the user pursuant to the step of box 24 will determine how many funds the index ultimately will contain.

The box designated 32 represents the step of displaying a graph of the combined funds over time periods (t), showing their combined statistical performance based upon the calculation method selected set forth in box 26. The computer is instructed to return to box 10 so the program may repeat itself.

Referring to FIG. 2, the box designated 40 represents the group of open end mutual funds selected pursuant to the steps set forth in FIGS. 1A and 1B. These funds own financial securities including stock securities (box 42), bonds and money market instruments (box 44) and or hybrid, illiquid securities (box 46). The N.A.V. is calculated by the open end funds at the end of the day and disseminated to the closed end fund of funds.

The box designated 48 represents the closed end fund of funds which synthetically replicates the performance of those open end funds contained within box 40. By investing all available assets in box 40, the closed end fund of funds statistical performance correlates strongly and consistently with the open end funds located in box 40. A computerized accounting and reporting system, located within the closed end fund of funds, receives overall position reports of changes in fund share ownership through an electronic data link with an exchange clearing computer represented by box 50. Box 48 is the National Securities Exchange ("N.S.E.") clearing computer electronically calculating the overall positions of shareholders at the end of the day and then transferring all shareholder information to the closed end fund. Upon receipt of this information, the accounting and reporting system generates information regarding tax liabilities, financial reports and other relevant documentation to shareholders, government agencies and other relevant parties.

Box 52 represents an electronic data link between the N.S.E. computer and the closed end fund of funds. The closed end fund of funds calculates its net asset value and disseminates that information to the N.S.E. on a daily basis. The N.S.E. then publishes that information to market participants including broker/dealers and institutional investors (box 54), market makers (box 56), brokerage firms (box 58) and public investors (box 60) who then buy and sell the synthetic fund shares intra-day at any mutually agreed upon price (which is used by market participants to derive the price of linked derivative securities). Linked derivative security valuations on the closed end fund of funds are generated, as represented by box 62, the valuation of which is based upon the market prices generated through real-time trading of the relevant closed end fund of funds by market participants located in box 54, box 56, box 58, and box 60. Box 62 is the N.S.E. computer calculating an index of various closed end fund of funds traded.

Box 64 represents the electronic data link between the N.S.E. clearing computer, which keeps track of the exchange trades that occur during the day, and the closed end synthetic fund.

While the inventors believe that an index of open end mutual funds comprised of those funds that have the largest return on investment and the lowest risk combination may outperform those funds that, in contrast, have demonstrated lower returns and higher risk, it must be noted that past performance does not guarantee similar performance in the future.

Thus, the reader will see that the index of mutual funds described herein provides a means for identifying superior historical performance within each subgroup obtainable through a screening process which minimizes the selection of high risk/low return open end mutual funds and maximizes the selection of those funds with low risk/high return statistical data. The hope is that by identifying and investing within an index of funds that have demonstrated superior risk/return ratios within a particular sector, these funds will continue to produce superior returns with low risk in the future than their peers.

The creation of a separate security, the preferred embodiment being a "closed end fund of funds", provides the means for investing intra-day in the desired open end funds, and enables market participants to derive a real-time valuation for linked derivative securities.

While the above description contains many specific examples, these should not be construed as limitations on the scope of the invention, but rather as an exemplification of one preferred embodiment thereof. Many variations are possible. For example, instead of creating a closed end fund of funds, a unit investment trust could be created to replicate the performance of an open end fund or group of funds. While this security could have large swings in its capitalization level, it nevertheless may be able to replicate the performance of an open end fund or group of funds, and act as a hedge for listed derivative securities.

In addition, an index could be created based upon such strict requirements that the index would be limited to just one fund. Another index variation might be one that selects only those funds that beat an external index such as the S&P500 or Dow Jones Industrial Average. In addition, an index of securitized funds, as well as linked derivative securities including puts and calls, futures, caps and floors, total return swaps, collars, warrants, equity swaps, swaptions, knock-out options and variation thereof could be traded through the Over the Counter Market, which is located off the exchange floor. Accordingly, the scope of the invention should be determined not by the embodiments illustrated, but by the appended claims and their legal equivalents.

We claim:

1. A computer system for creating a leveraged exchange traded product comprising a leveraged portfolio of securities, the system comprising:
   a computer memory comprising a set of user defined criteria and a computer database containing data representing characteristics of a plurality of securities; and,
   a processor for selecting at least two of the securities for inclusion in the leveraged exchange traded product based on market capitalization data contained in the database, the processor weighting the selected securities within the exchange traded product based on the set of user defined criteria;
   wherein the leveraged exchange traded product is configured for trading of shares of the leveraged exchange traded product at a real time determined price of the shares related to the underlying price of each of the selected securities comprising the leveraged exchange traded product and related to the respective weightings of the selected securities.

2. The computer system of claim 1 further comprising an exchange computer for listing the shares of the exchange traded product available for purchase or sale.

3. The computer system of claim 2 wherein the exchange computer also lists derivatives available for purchase or sale, the derivatives having a price related to the real time determined price of the exchange traded product.

4. The computer system of claim 1 further comprising an accounting system for calculating financial statements for dissemination to the owners of the shares.

5. The computer system of claim 2 wherein the exchange computer is configured for electronic trading of the shares.

6. A computer implemented system for exchanging shares in an exchange traded product, the system comprising:
   a display for displaying data representing shares of an exchange traded product comprising a leveraged portfolio of securities satisfying market capitalization criteria, the securities within the portfolio being weighted, wherein the leveraged exchange traded product is configured for trading shares of the leveraged exchange traded product at a real time determined price of the shares related to the underlying price of each of the selected securities comprising the leveraged exchange traded product and related to the respective weightings of the selected securities; and
   an exchange computer for processing the exchange of the shares at a price related to the price of the securities within the leveraged portfolio, the exchange computer configured to transmit data indicative of trades which occur intra-day over a communication network to an exchange clearing computer.

7. The computer implemented system of claim 6 wherein the display also displays data representing at least one derivative product having a price related to the price of the shares.

8. The computer system of claim 1 wherein the processor interacts with the computer database to monitor changes in the selected securities.

9. The computer system of claim 8 wherein the processor alters the securities which make up the exchange traded product in response to data in the computer database representing changes in the selected securities.

10. The computer system of claim 1 wherein said processor calculates a net asset value of the exchange traded product.

11. The computer system of claim 1 wherein the exchange traded product comprises at least one product selected from the group consisting of puts and calls, futures, caps and floors, total return swaps, collars, warrants, equity swaps, options and knock-out options.

12. The computer system of claim 1 wherein the exchange traded product is not a unit investment trust.

13. The computer system of claim 1 wherein the processor is configured to select only securities in a specific index.

14. The computer system of claim 13 wherein the index is the Dow Jones Industrial Average.

15. The computer system of claim 13 wherein the index is the S&P 500.

16. The computer system of claim 1 wherein the exchange computer is further configured to execute a hedge trade that can be traded for a price related to the price of the shares of the exchange traded product.

17. The computer system of claim 1 wherein the user defined criteria comprises at least one of the group consisting of fund net asset value (N.A.V.) for each year, portfolio composition, investment objective, load adjusted and unadjusted return, maximum sales charge, median market capitalization, daily, monthly, quarterly, yearly, multi-year returns, mpt, beta, sharpe, R squared, standard deviation, historical risk/reward ratios, N.A.V. distribution adjusted earning, payout ratio, potential capital gains exposure, price/book ratio, price/earnings ratio, prospectus, purchase constraints, redemption fees, sector weighting, shareholder fees, total return, total return percentile, turnover ratio, deferred fees, debt % total capitalization, dividends, distributor, telephone number, manager name, manager tenure, class of shares, and brokerage availability.

18. The computer system of claim 1 wherein the processor is configured to select only securities from within a substantially similar industry.

19. The computer system of claim 6 wherein the display is also provided for displaying information indicative of the value of the exchange traded product on at least an end of day basis in humanly readable format.

20. The computer implemented system of claim 6 wherein the exchange clearing computer is comprised to compute and transmit data resulting from trades of shares of the exchange traded product to third party accounting systems that manage the securities which make up the exchange traded product.

21. The computer implemented system of claim 6 wherein the display is located on the floor of a public exchange.

22. The computer implemented system of claim 6 wherein the exchange traded product further comprises at least one product selected from the group consisting of puts and calls, futures, caps and floors, total return swaps, collars, warrants, equity swaps, options and knock-out options.

23. The computer implemented system of claim 6 wherein the exchange traded product is not a unit investment trust.

24. The computer implemented system of claim 6 further comprising a processor for correlating the price of the shares to the price of the securities within the leveraged portfolio.

25. The computer implemented system of claim 6 wherein the securities within the leveraged portfolio satisfy a user defined risk criteria.

26. The computer implemented system of claim 25 wherein the user defined risk criteria comprises at least one of the group consisting of fund net asset value (N.A.V.) for each year, portfolio composition, investment objective, load adjusted and unadjusted return, maximum sales charge, median market capitalization, daily, monthly, quarterly, yearly, multi-year returns, mpt, beta, sharpe, R squared, standard deviation, historical risk/reward ratios, N.A.V. distribution adjusted earning, payout ratio, potential capital gains exposure, price/book ratio, price/earnings ratio, prospectus, purchase constraints, redemption fees, sector weighting, shareholder fees, total return, total return percentile, turnover ratio, deferred fees, debt % total capitalization, dividends, distributor, telephone number, manager name, manager tenure, class of shares, and brokerage availability.

27. The computer implemented system of claim 6 wherein the system is adapted to implement an over the counter market for buying and selling a derivative having a price related to the price of the exchange traded product.

28. The computer implemented system of claim 6 wherein the display also displays a hedge that can be bought and sold for a price related to the price of the shares of the exchange traded product.

29. The computer implemented system of claim 6 wherein the exchange computer is configured to facilitate electronic trading of the shares of the exchange traded product.

30. The computer implemented system of claim 6 wherein the exchange computer is configured to facilitate buying and selling of the shares of the exchange traded product at a mutually agreed upon price.

31. The computer implemented system of claim 6 wherein the exchange traded product is open ended.

32. A computer system for creating a leveraged exchange traded product comprising a leveraged portfolio of securities, the system comprising:
   a computer memory comprising a set of defined criteria and a computer database containing data representing characteristics of a plurality of securities; and
   a processor for selecting at least two of the securities for inclusion in the leveraged exchange traded product based on market capitalization data contained in the database, the processor weighting the selected securities within the exchange traded product based on the set of defined criteria;
   wherein the leveraged exchange traded product is configured for trading of shares of the leveraged exchange traded product at a real time determined price of the shares related to the underlying price of each of the selected securities comprising the leveraged exchange traded product and related to the respective weightings of the selected securities, and wherein the leveraged exchange traded product is open ended.

33. The computer system claim of 32 further comprising an exchange computer for listing shares of the exchange traded product available for purchase or sale.

34. The computer system of claim 32 wherein the processor is configured to select only securities from within a substantially similar industry.

35. The computer system of claim 32 wherein the leveraged exchange traded product is a unit investment trust.

36. The computer system of claim 32 wherein the leveraged exchange traded product is not a unit investment trust.

37. The computer system of claim 32 wherein the exchange traded product is a fund.

38. The computer system of claim 32 wherein the exchange traded product is not a fund.

39. The computer system of claim 32 wherein the leveraged exchange traded product has a class of shares.

40. A computer implemented system for exchanging shares in an exchange traded product, the system comprising:
   a display for displaying data representing shares of an exchange traded product, comprising a leveraged portfolio of securities satisfying market capitalization criteria, the securities within the portfolio being weighted, wherein the leveraged exchange traded product is configured for trading shares of the leveraged exchange traded product at a real time determined price of the shares related to the underlying price of each of the selected securities comprising the leveraged exchange traded product and related to the respective weightings of the selected securities, and wherein the exchange traded product is open ended; and an exchange computer for processing the exchange of the shares at a price related to the price of the securities within the leveraged portfolio, wherein the exchange computer is configured to transmit data indicative of trades which occur intra-day over a communication network to an exchange clearing computer.

41. The computer implemented system of claim of 40 wherein the exchange computer is configured to facilitate electronic trading of the shares of the exchange traded product.

42. The computer implemented system of claim 40 wherein the exchange computer is configured to facilitate buying and selling of the shares of the exchange traded product at a mutually agreed upon price.

43. The computer implemented system of claim 40 wherein the display also displays data representing at least one derivative product having a price related to the price of the shares.

44. The computer implemented system of claim 40 wherein the display is located on the floor of a public exchange.

45. The computer implemented system of claim 40 wherein the securities within the leveraged portfolio satisfy a performance criteria.

46. The computer implemented system of claim 45 wherein the securities within the portfolio have an expected future performance return greater than a group of securities comprising a benchmark on a daily basis.

47. The computer implemented system of claim 46 wherein the leveraged portfolio provides return greater than the group of securities comprising the benchmark on a daily basis.

48. The computer implemented system of claim 47 wherein the benchmark is an index.

49. The computer implemented system of claim 47 wherein the benchmark is not an index.

50. The computer implemented system of claim 40 wherein the securities within the leveraged portfolio satisfy a risk criteria.

51. The computer implemented system of claim 50 wherein the risk criteria is a risk percentage that is smaller than the risk for a group of securities comprising a benchmark.

52. The computer implemented system of claim 50 wherein the risk criteria is a risk percentage that is greater than the risk for a group of securities comprising a benchmark.

53. The computer implemented system of claim 52 wherein the percentage is at least 50%.

54. The computer implemented system of claim 50 wherein the risk criteria is beta.

55. The computer implemented system of claim 54 wherein the beta of the leveraged portfolio is at least 50% greater than the beta of a group of securities comprising a benchmark.

56. The computer implemented system of claim 40 wherein the leveraged exchange traded product is a unit investment trust.

57. The computer implemented system of claim 40 wherein the leveraged exchange traded product is not a unit investment trust.

58. The computer implemented system of claim 40 wherein the leveraged exchange traded product is a fund.

59. The computer implemented system of claim 40 wherein the leveraged exchange traded product is not a fund.

60. The computer implemented system of claim 40 wherein the processor is configured to select only securities from within a substantially similar industry.

61. The computer implemented system of claim 40 wherein the exchange traded product further comprises at least one product selected from the group consisting of puts and calls, futures, caps and floors, total return swaps, collars, warrants, equity swaps, options and knock-out options.

62. The computer implemented system of claim 40 wherein the leveraged exchange traded product has a class of shares.

63. A computer implemented system for exchanging shares in an exchange traded product, the system comprising:
a display for displaying data representing shares of an exchange traded product, comprising a leveraged portfolio of securities satisfying market capitalization and performance criteria, the securities within the portfolio being weighted and having an expected future performance return greater than a group of securities comprising a benchmark index;

wherein the leveraged exchange traded product is configured for trading shares of the leveraged exchange traded product at a real time determined price of the shares related to the underlying price of each of the selected securities comprising the leveraged exchange traded product and related to the respective weightings of the selected securities, and wherein the exchange traded product is open ended; and an exchange computer for processing the exchange of the shares at a price related to the price of the securities within the leveraged portfolio, wherein the exchange computer is configured to transmit data indicative of trades which occur intra-day over a communication network to an exchange clearing computer.

64. The computer implemented system of claim 63 wherein the benchmark index is the S&P 500.

65. The computer implemented system of claim 63 wherein the benchmark index is the Dow Jones Industrial Average.

66. The computer implemented system of claim 63 wherein the leveraged exchange traded product provides a return greater than a group of securities comprising a benchmark index on at least a daily basis.

67. The computer implemented system of claim 63 wherein the leveraged exchange traded product provides a return greater than a group of securities comprising a benchmark index on at least a monthly basis.

68. The computer implemented system of claim of 63 wherein the exchange computer is configured to facilitate electronic trading of the shares of the exchange traded product.

69. The computer implemented system of claim 63 wherein the exchange computer is configured to facilitate buying and selling of the shares of the exchange traded product at a mutually agreed upon price.

70. The computer implemented system of claim 63 wherein the exchange computer is further configured to list derivatives available for purchase or sale, the derivatives having a price related to the real time determined price of the exchange traded product.

71. The computer implemented system of claim 63 wherein the securities within the leveraged portfolio satisfy a risk criteria.

72. The computer implemented system of claim 71 wherein the risk criteria is a risk percentage that is smaller than the risk of the group of securities comprising the benchmark index.

73. The computer implemented system of claim 71 wherein the risk criteria is a risk percentage that is greater than the risk of the group of securities comprising the benchmark index.

74. The computer implemented system of claim 73 wherein the percentage is at least 50%.

75. The computer implemented system of claim 71 wherein the risk criteria is beta.

76. The computer implemented system of claim 75 wherein the beta of the leveraged portfolio is at least 50% greater than the beta of the group of securities comprising the benchmark index.

77. The computer implemented system of claim 63 wherein the exchange traded product further comprises at least one product selected from the group consisting of puts and calls, futures, caps and floors, total return swaps, collars, warrants, equity swaps, options and knock-out options.

78. The computer implemented system of claim 63 wherein the leveraged exchange traded product is a unit investment trust.

79. The computer implemented system of claim 63 wherein the leveraged exchange traded product is not a unit investment trust.

80. The computer implemented system of claim 63 wherein the leveraged exchange traded product is a fund.

81. The computer implemented system of claim 63 wherein the leveraged exchange traded product is not a fund.

82. The computer implemented system of claim 63 wherein the leveraged exchange traded product has a class of shares.

* * * * *